United States Patent [19]

Loyd

[11] Patent Number: 5,345,708
[45] Date of Patent: Sep. 13, 1994

[54] FISHING POLE SUPPORT

[76] Inventor: Maynard L. Loyd, 2510 Robinson St., Colorado Springs, Colo. 80904

[21] Appl. No.: 20,546

[22] Filed: Feb. 22, 1993

[51] Int. Cl.$^5$ .............................................. A01K 97/10
[52] U.S. Cl. ...................................... 43/21.2; 43/15
[58] Field of Search ........................ 43/21.2, 15, 16; 248/538, 514

[56] References Cited

U.S. PATENT DOCUMENTS

| 2,744,351 | 5/1956 | Smith | 43/16 |
| 2,766,543 | 10/1956 | Beck | 43/16 |
| 3,762,090 | 10/1973 | Nelson | 43/15 |
| 3,832,794 | 9/1974 | Encinias | 43/15 |
| 4,031,651 | 6/1977 | Titze | 43/15 |
| 4,354,324 | 10/1982 | Eblen | 43/15 |
| 4,730,408 | 3/1988 | Miller | 43/15 |
| 4,750,286 | 6/1988 | Gray | 43/15 |
| 5,076,001 | 12/1991 | Coon | 43/15 |
| 5,249,387 | 10/1993 | Slocum | 43/16 |

FOREIGN PATENT DOCUMENTS 0197810 10/1978 Netherlands ......................... 43/21.2

Primary Examiner—P. Austin Bradley
Assistant Examiner—James Miner
Attorney, Agent, or Firm—Richard W. Hanes

[57] ABSTRACT

An ice fishing support assembly for a fishing rod which carries a fishing line. The support assembly includes a pivotally mounted fishing rod holder having a spring connected thereto to bias the holder to an angular position relative to the horizontal, and a latching rod connected to the holder for retaining the fishing rod in a cocked position. The latching rod is pivotally mounted to a base member intermediate the ends of the latching rod wherein one of the ends of the latching rod projects over the fishing rod and where the other end of the latching rod includes an open ended eyelet for engaging a stretch of the fishing line so that tension on the line produces rotation of the latching rod.

2 Claims, 2 Drawing Sheets

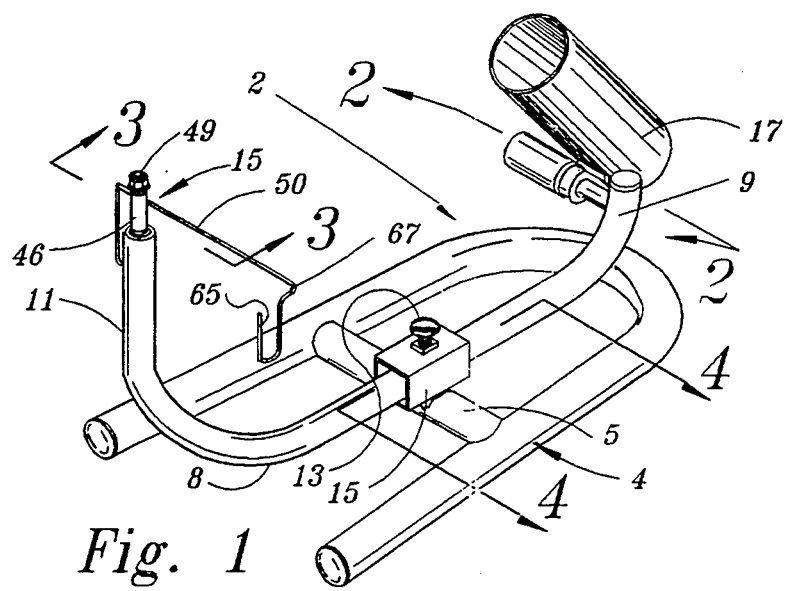
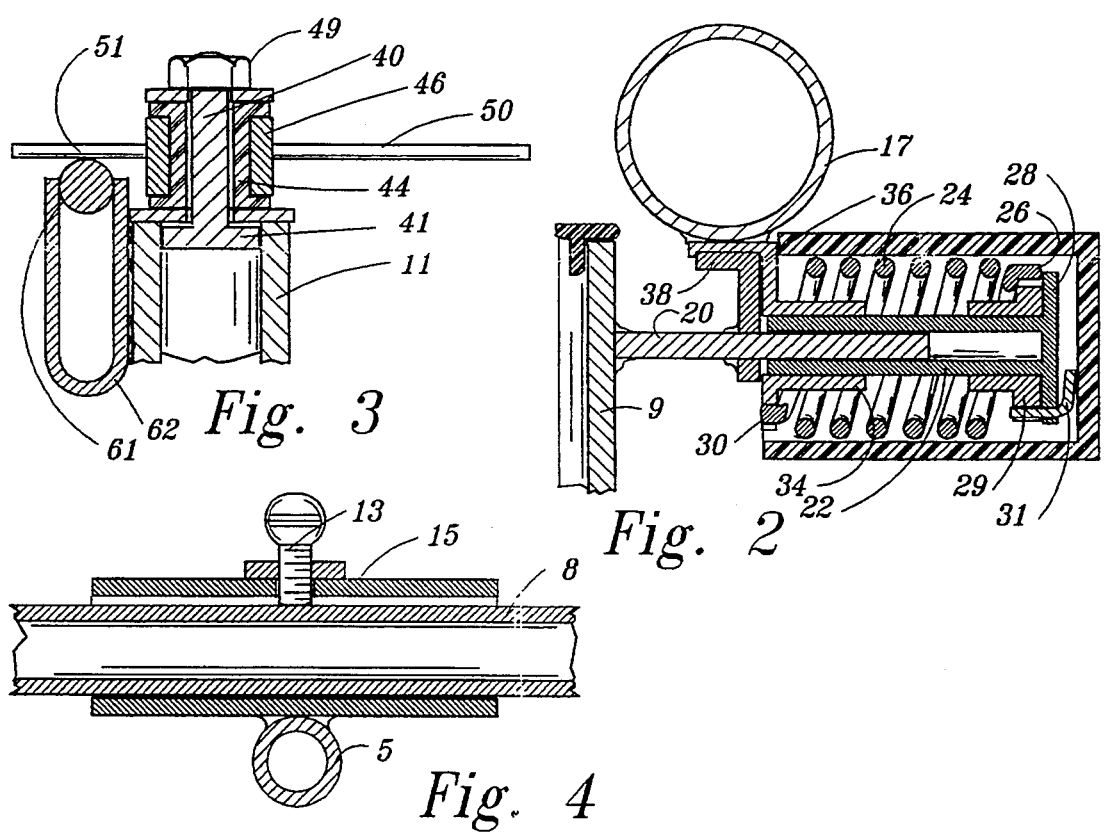

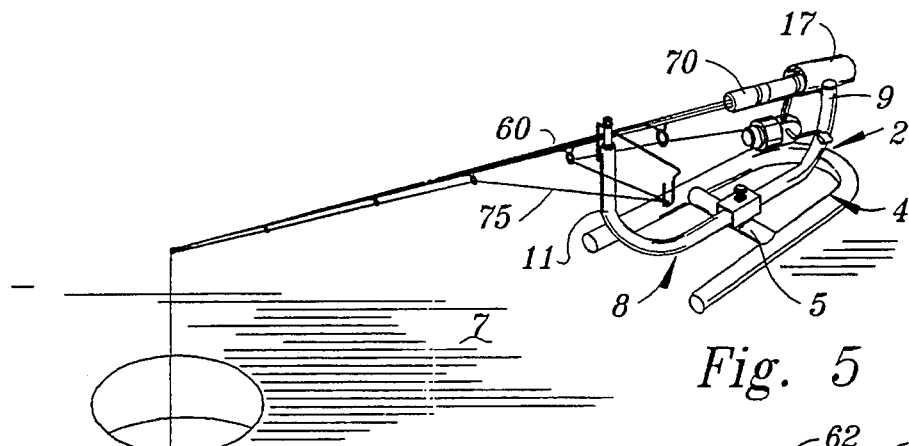
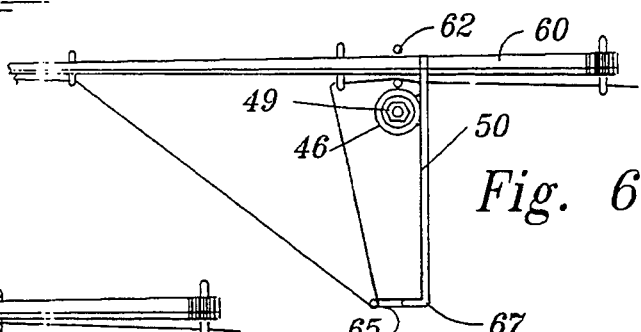
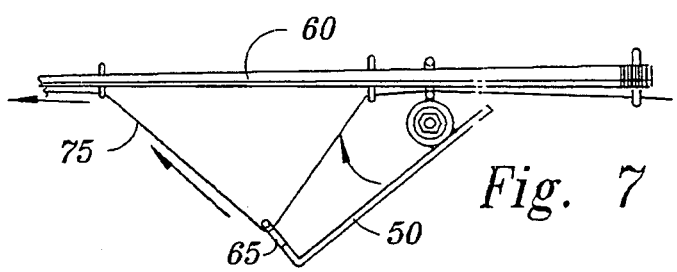
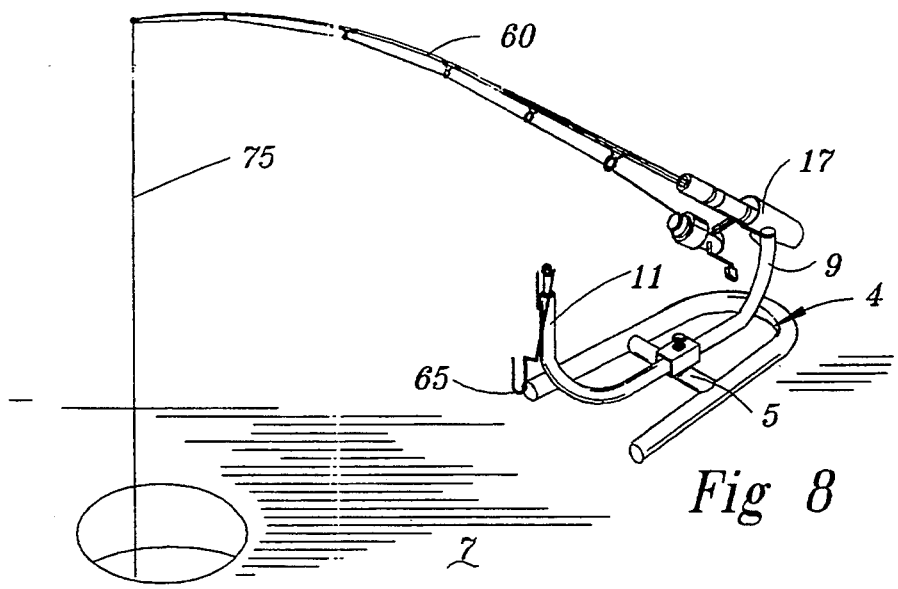

FISHING POLE SUPPORT

The present invention relates generally to a support mechanism for holding a fishing pole and tending the fishing line and relates more particularly to such a support adapted for use in ice fishing where the line tending function of the support includes a triggering device to respond to a tug on the fishing line to quickly and deftly snatch the line in order to set the hook into the biting fish.

BACKGROUND

Fishing pole holders for bank fishing have come and gone, many devised with alarm devices which are triggered by movement of the fishing line to signal the presence of a potential catch if the fisherman takes over control of the fishing pole. In bank fishing vertical movement of the rod tip by itself would probably not result in setting the fish hook because the outstretched line is usually at a small angle to the axis of the fishing rod and an upward pull on the line would do little more than make a slight change in the angle between the rod and the line. In order to set the hook the accelerated or snatching force must be almost directly opposite to the direction of the line itself. Ice fishing lends itself to mechanical line tending and activation of the rod tip. By definition, the ice fishing line is almost perpendicular to the rod and upward movement of the rod tip results in swift movement of the line in the correct direction to set the hook.

It is therefore the primary purpose of the present invention to provide a pole holder and line tending apparatus for an ice fishing pole which can be cocked or loaded for hook setting action and then triggered into release by a movement of the fishing line to accelerate the pole into an angular position where the rod tip is elevated from its quiescent position.

A second object of the invention is to provide a simple triggering mechanism which can be easily set and reset.

Other and further objects, features and advantages of the invention will become apparant from a reading of the detailed description of a preferred form of the invention, taken in conjunction with the accompanying drawings.

THE DRAWINGS

FIG. 1 is a perspective view of the fishing pole holder of the present invention.

FIG. 2 is a cross sectional view taken along lines 2—2 of FIG. 1.

FIG. 3 is a cross sectional view taken along lines 3—3 of FIG. 1.

FIG. 4 is a cross sectional view taken along lines 4—4 of FIG. 1.

FIG. 5 is a perspective view of the fishing pole holder of the present invention as would be seen in actual use with a fishing pole being supported by the inventive device in fishing position.

FIG. 6 is a top view of the trigger device of the present invention when the fishing line is threaded through the mechanism and the latch portion of the trigger mechanism is securing the pole in the position shown in FIG. 5.

FIG. 7 is similar to FIG. 6 except that is demonstrates how movement of the fishing line, in the direction of the arrows, unlatches the trigger mechanism, allowing the spring biased holding cup to be released.

FIG. 8 is similar to FIG. 5 except that the latching mechanism had been released by the line actuated trigger and the spring biased holding cup had rotated through an angle to change the angle of the fishing rod and elevate the tip of the rod to produce vertical movement of the fishing line and a setting of the fish hook attached to the end of the line.

SUMMARY OF THE INVENTION

The present invention is an apparatus for tending a fishing rod which carries a fishing line having a pivotally mounted fishing rod holder with a spring connected thereto to bias the holder to an angular position relative to the horizontal.

latching means connected to the holder for retaining the fishing rod in a cocked position where the latching means resists the pivotal force of the spring and where said means comprises, a latching rod pivotally mounted intermediate its ends where one of said ends, within a given sector of the angular rotation of the latching rod, projects over the fishing rod and where the other end of the latching rod includes an open ended eyelet for engaging a stretch of the fishing line so that tension on the line produces rotation of the latching rod.

DETAILED DESCRIPTION

The fishing rod holder of the present invention is generally designated in the drawings by reference numeral 2. An "A" shaped base member 4 having a cross bar 5 is constructed of rigid tubing and is adapted to lay flat on the ice 7. A generally "U" shaped bracket 8 with one short side 9 and a longer upright 11 is clamped onto the cross member 5 by the pressure of a tightened threaded wing nut 13 supported by a hollow journaling tube 15, as shown in FIG. 4. The plane of the bracket 8 substantially bisects the "A" frame 4 along its longitudinal axis.

The short upright side 9 of the bracket 8 serves to mount a rod handle holding cup 17 while the longer upright side 11 carries the rod latching mechanism 15.

The rod handle holding cup 17 may be a hollow tube, with or without a bottom or any other appropriate device for carrying the handle end of a fishing rod. Supporting the cup 17 is a fixed beam 20 attached to the upright 9 by welding or other known means. Cantilevered on the end of the beam 20 is a hollow shaft 22 around which is circumscribed a coil spring 24 one end 26 of which if fixed in position by its attachment to the end flange 28 of the fixed in place shaft 22. The other end 30 of the spring 24 is attached to a collar 34 journaled for rotation on the shaft 22. The cup 17 is attached to an upper extension 36 of the rotatable collar 34. The stored energy of the wound spring 24 provides a biasing force which tends to rotate the cup 17 around the beam 20 as an axis, however a stop member 38 attached to the beam 20 is positioned so as to interfere with rotation of the cup after the cup rotates to approximately a 45 degree angle from the horizontal.

The latching mechanism 15 is supported by the upstanding longer end 11 of the bracket 8. A bolt 40 having a head 41 is secured within the upper end of the hollow tubing forming the upright 11 and around the shaft of the bolt is mounted a plastic bearing 44 which is rotatable on the shaft of the bolt 40. A nut 49 maintains the assembly in place. A sleeve 46 is mounted on the bearing 44 for rotation therewith and to the sleeve 46 is tangentially attached a latching rod 50. The latching rod 50 comprises an elongated rigid wire which is parallel to the plane of the base member 4. One end 51 of the wire latching rod extends beyond the periphery of the sleeve 46 so that when the sleeve 46 is rotated to the position where the rod 50 is parallel with the cross member 5 of the base and perpendicular to the plane of the bracket 8 the rod end 51 extends over the fishing rod 60 which is cradled in a "U" shaped bracket 62, also attached to the upright 11. The other end of the latching rod 50 is provided with a line retainer 65 comprising an upwardly open "U" shaped bend in the wire of the rod 50, the plane of the "U" being perpendicular to the rod 50 and spaced apart therefrom by a lateral bend 67 of the wire between the rod 50 and the adjacent leg of the "U" shaped line retaining bend in the wire.

Operation of the device of the present invention is shown in FIGS. 5-8. A fishing rod 60 having a handle 70 is supported by the holder 2. The rod handle 70 is inserted into the holding cup 17 and the cup is rotated against the pressure of the spring 24 to a substantially level position where the rod is lowered into the bracket 62. The end 51 of the latching rod 50 is rotated so that the end 51 extends over the rod 60, latching it in place against the biasing force of the spring 24 which is tending to rotate the rod upwardly. A stretch of the fishing line 75 between two ferrules on the rod is pulled laterally and routed through the "U" shaped line retainer 65. The end of the line 75 containing the fishing hook is lowered into the water through a hole in the ice.

When a fish bites on the hook and pulls the line 75 in the direction shown by the arrows in FIG. 7 the tension on the line provides a force moment on the latching rod 50 through the line retainer 65 which rotates the latching rod and its sleeve 46, moving the latching rod end 51 away from its latching position over the rod 60 and allowing the spring biasing force on the holding cup 17 to quickly rotate the cup and raise the end of the rod 60 to snatch the line 75 and set the hook in the fish's mouth. The fishing rod 60 is shown in its raised position following release of the latching mechanism in FIG. 8.

I claim:

1. An ice fishing support assembly for a fishing rod which carries a fishing line comprising, a flat "A" shaped planar base member having a cross bar, and adapted to be placed directly on the ice, a U-shaped bracket attached to said cross bar carrying spaced apart rod holding means and rod latching means where the rod holding means includes, a rotatable and handle receiving tubular member and spring means biasing the tubular member into a rotated angular position with respect to the plane of the base member, and where the rod latching means includes a pivotal lever arm which may be selectively positioned over a portion of the fishing rod to retain the rod in a loaded position against the rotating force of the spring means, and line retaining means integral with the latching means and integral with the pivotal lever arm to retain a stretch of the fishing rod line in a position to create a rotating force moment on the latching means when tension is created in the fishing line.

2. The combination of claim 1 where in the line retaining means includes an upwardly open "U" shaped segment disposed at the end of the pivotal lever arm, the plane of which is perpendicular to the lever arm.

* * * * *